United States Patent [19]
Skirde

[11] Patent Number: 5,941,689
[45] Date of Patent: Aug. 24, 1999

[54] CONTROL SYSTEM AND METHOD TO CONTROL VARIABLE HYDRAULIC PUMPS WITH A TEMPERATURE SENSOR

[75] Inventor: Eckhard Skirde, Aukrug-Böken, Germany

[73] Assignee: Sauer Inc., Ames, Iowa

[21] Appl. No.: 08/862,935

[22] Filed: May 29, 1997

[30] Foreign Application Priority Data

Jun. 3, 1996 [DE] Germany ............................ 196 22 267

[51] Int. Cl.⁶ .................................................. F04B 49/10
[52] U.S. Cl. .............................................. 417/32; 417/53
[58] Field of Search .................................. 417/12, 28, 32, 417/53; 60/450, 452, 464, 329

[56] References Cited

U.S. PATENT DOCUMENTS

| | | | |
|---|---|---|---|
| 3,236,049 | 2/1966 | Reinke ........................................ | 60/53 |
| 4,368,798 | 1/1983 | Meyerle et al. ........................ | 180/307 |
| 4,802,336 | 2/1989 | Mayr et al. .............................. | 60/448 |
| 5,285,642 | 2/1994 | Watanabe et al. ....................... | 60/452 |
| 5,352,095 | 10/1994 | Tanaka et al. ............................ | 417/12 |
| 5,758,499 | 6/1998 | Sugiyama et al. ....................... | 60/450 |

FOREIGN PATENT DOCUMENTS

3043837 A1  5/1982  Germany .
3619147A1  12/1987  Germany .

*Primary Examiner*—Charles G. Freay
*Assistant Examiner*—Robert Z. Evora
*Attorney, Agent, or Firm*—Zarley, McKee, Thomte, Voorhees & Sease

[57] ABSTRACT

A control system for a variable pump and a process to control the variable pump with a circuit connected to a hydraulic motor by working lines, controlled by an electronic controller, having check valves in the circuit to allow oil flow from a charge pump going into the circuit and further consisting of high pressure relief valves to allow oil flow out of the working lines to limit maximum pressure. A temperature sensor is placed between the high pressure relief valves and the connected check valves. A signal is processed in an electronic control to control the displacement of a variable pump, depending on temperature measure of the fluid flowing across the high pressure relief valves.

11 Claims, 2 Drawing Sheets

CONTROL SYSTEM AND METHOD TO CONTROL VARIABLE HYDRAULIC PUMPS WITH A TEMPERATURE SENSOR

BACKGROUND OF THE INVENTION

Control systems to control hydraulic pumps are well known. In hydraulic systems with open or closed loop circuits, the working pressure is limited by pressure relief valves which are supported by pressure override or pressure limiter systems. The pressure override or pressure limiter systems control the oil flow of a variable hydraulic pump in a hydraulic circuit in a way that the pressure energy of a minimum oil flow is converted into heat. The oil flow from the pressure relief valve to control maximum pressure imported will through a check valve on the other side of the circuit keep the mass of oil inside the circuit at a constant value. These systems with pressure override or pressure limiter functions are used in a variety of applications where the probability exists that at high power conditions a high amount of pressure energy of a relatively large oil flow is converted into heat. Therefore based on quick temperature rise, excessive heat energy will be dissipated, resulting finally in overheating and damage of the units.

Therefore, a principal object of the invention is to provide a control system for a variable hydraulic pump and a control process for the same, whereby in high power conditions the pressure energy converted into heat will be minimized with a simple system design.

This and other objects will be apparent to those skilled in the art.

SUMMARY OF THE INVENTION

This invention involves the control system for a variable hydraulic pump. It has a circuit connected with a hydraulic motor by working pipes which utilizes an electronic control in a circuit which uses check valves that allow oil fluid from a charge pump to pass through the valve into the working lines. In addition, a high pressure relief valve is integrated into each side of the working lines. A temperature sensor is positioned between the high pressure relief valve, protecting one side of the circuit and the check valve on the other side of the circuit. The signal of the temperature sensor is connected to the electronic control. The control output will control the displacement of the hydraulic pump to control the oil flow through the high pressure relief valves.

In one design sample, the signal coming from the electronic control with input from the temperature sensor is connected to a control valve which controls the servo pressure on one side of the servo piston to control the displacement of the variable pump. Preferably, the control valve is a two-position three-port valve for each side of the servo piston. Both of the two-position three-port valves are controlled individually by the electronic control so that each side of the servo piston is directly controllable in relation to the signal of the temperature sensor. In such a system, the temperature control is conducted by micro processor which is used to control the total pump performance.

In another design example, the temperature signal processed in the electronic control is used as an electronic pressure limiting system for an additional valve which works in conjunction with the control valve to control the servo piston of the variable pump. In such a simplified system, the additional valve will control the supply of the servo piston of the variable pump controlled by the temperature sensor signal manipulated in the control electronics.

In another design example, the additional valve is a two-position three-port valve, preferably for the control of the servo piston a three-position four-port valve is used.

In another design example, the temperature sensor provides a signal by measuring the temperature of the hydraulic fluid behind the high pressure relief valve. That temperature preferably is the maximum allowable temperature, or a signal representing the maximum temperature. On the basis of the maximum temperature signal, the displacement of the variable pump is controlled in a way that the minimum amount of pressure energy in the circuit is converted into heat by oil flow over the high pressure relief valve.

In another design example, the control circuit uses the rate of temperature change in conjunction with the maximum temperature as a signal, e.g. the temperature sensor provides a signal presenting the rate of temperature change. This signal is imposed on the electronic control from which the displacement of the variable pump can be temperature controlled The maximum temperature as well as the rate of temperature change can also be measured with the same sensor and provide the basis for the control concept.

In the instant invention, the control process preferably controls a variable pump in a closed loop circuit. A temperature signal from a temperature sensor inside the circuit is manipulated in the electronic control and the output of the temperature sensor system controls the displacement of the variable pump to control the amount of oil flowing across the high pressure relief valve. By controlling the flow across the high pressure relief valve, the amount of pressure energy converted into heat energy can be controlled.

According to another design example, the displacement is controlled on basis of maximum temperature and/or temperature change rate. The maximum temperature or the temperature change rate by itself can also be controlled with this control indirectly controlling the amount of hydraulic fluid across the high pressure relief valve. This controls the amount of energy which is converted from pressure into heat.

According to another design example, the displacement of the variable pump is controlled towards a predetermined value when the maximum amount of oil flow through the high pressure relief valve is met or exceeded. This predetermined value can be stored in the electronic control so that in case of achieving the maximum allowable oil flow through the high pressure relief valve, this value is utilized to control the displacement.

Other advantages, features, and applications of the invention will be apparent to those skilled in the art.

DESCRIPTION OF THE PREFERRED EMBODIMENT

Figure 1:
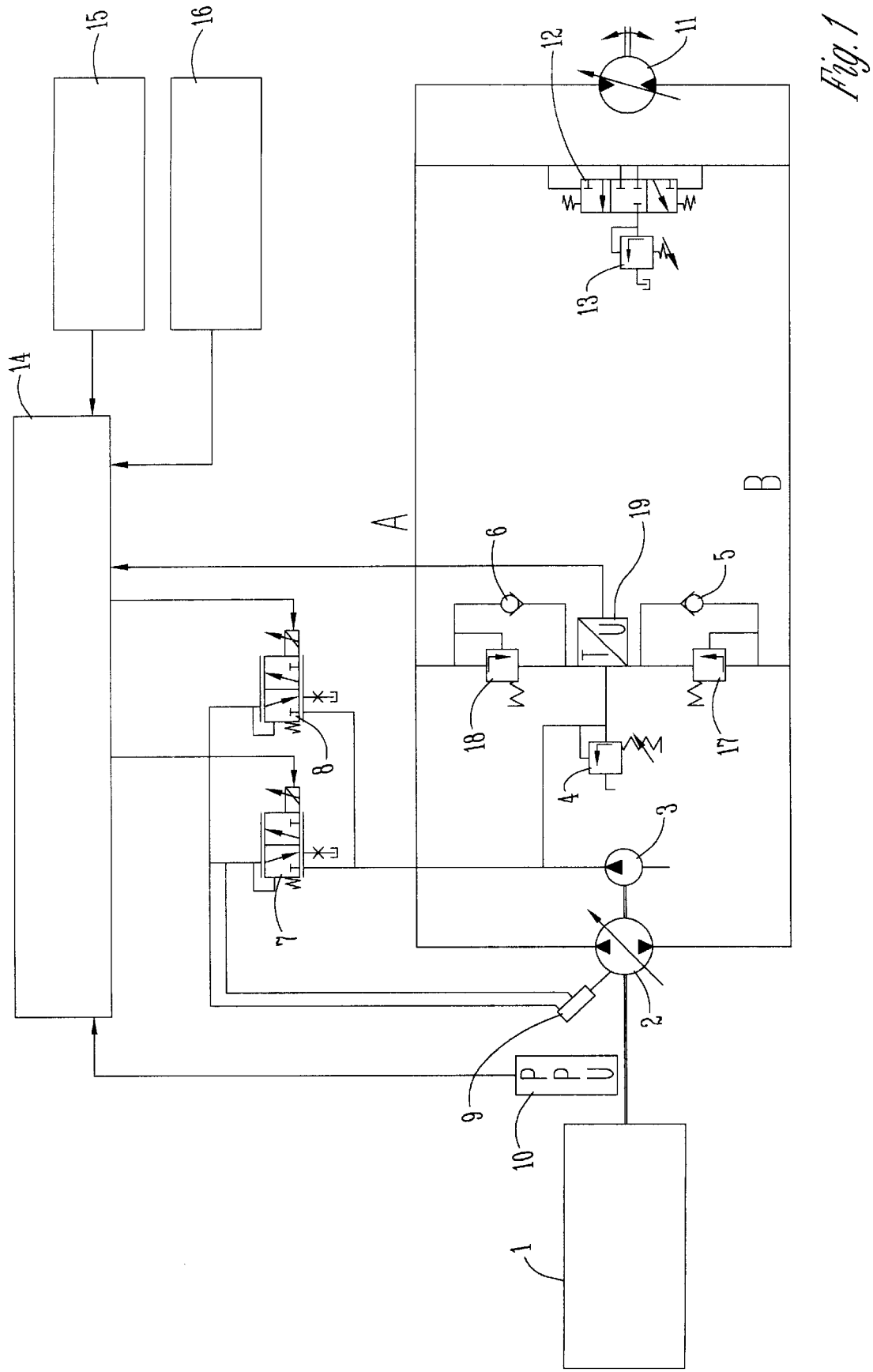
FIG. 1 is a control system in a closed circuit with a temperature sensor according to the invention between the high pressure relief valves and the check valves.

FIG. 1 shows a control system for a variable pump in a closed circuit where the temperature signal of the temperature sensor 19 is connected with an electronic controller from which the output signal will be used to control the variable pump. The principal design of the closed loop system is state of the art.

An engine 1 drives by an output shaft a variable hydraulic pump 2 to which a charge pump 3 is connected. The charge pump 3 provides on one hand oil through a control valve 7, 8, which is a two-position three-port valve, to one side of the servo piston 9. By individually controlling the valves 7 or 8, the displacement of the pump 2 is controlled by servo piston 9 in one or the other direction. In addition, the charge pump 3 with a pressure relief valve 4 is connected with a line to provide charge flow into the working lines A and B. In these working lines A and B, high pressure relief valves 17 and 18 are connected to check valves 5 and 6, respectively. It is state of the art, that the high pressure relief valve and the check valve is one valve cartridge. Between the charge pressure relief valve 4 and the check valves 5 and 6, the temperature sensor 19 is located which measures the temperature of the hydraulic fluid and sends a corresponding signal to the electronic control 14. The temperature sensor 19 measures the temperature of hydraulic fluid and the temperature change rate of the hydraulic fluid and provides this information as a signal to electronic control 14. The high pressure relief valves 17, 18 and the check valves 5, 6 for the respective working lines A and B are designed in a way that the oil flow from charge pump 3 can flow into the lower pressure working line A or B. The check valves 5 and 6 are designed in a way that a flow-back of the hydraulic fluid is not possible. To prevent overloading of working lines A and B and therefore hydraulic motor 11, the high pressure relief valves 17, 18 protect the system from loads higher than the system is designed for.

The hydraulic motor 11 can optionally be equipped with a flushing valve 12. This flushing valve is used in such cases when in closed circuit applications where high temperatures or high contamination can occur. In addition to the flushing valve 12, a pressure relief valve 13 is implemented. Preferably in application, the charge pressure relief valve 4 and the charge pressure relief valve 13 will be adjusted to the same pressure level.

In a transmission system according to FIG. 1, the electronic control 14 is additionally connected with a forward-neutral-reverse switch 15 and an inch sensor 16. With the F-N-R switch 15 and the inch sensor 16, the electronic control 14 achieves information from the driver of the vehicle from which the control of the variable pump 2 under consideration of the oil temperature is achieved.

The signal of the temperature sensor 19 showing the temperature and corresponding temperature change rate of the hydraulic fluid, is provided to electronic control 14. Control 14 manipulates this signal and gives output to the two-position three-port valves 7 and 8 to control the servo piston 9 of the variable pump 2. In a closed circuit, the application of a single temperature sensor 19 is sufficient to control the swash angle of variable pump 2 dependent on the temperature to prevent overloading.

Figure 2:
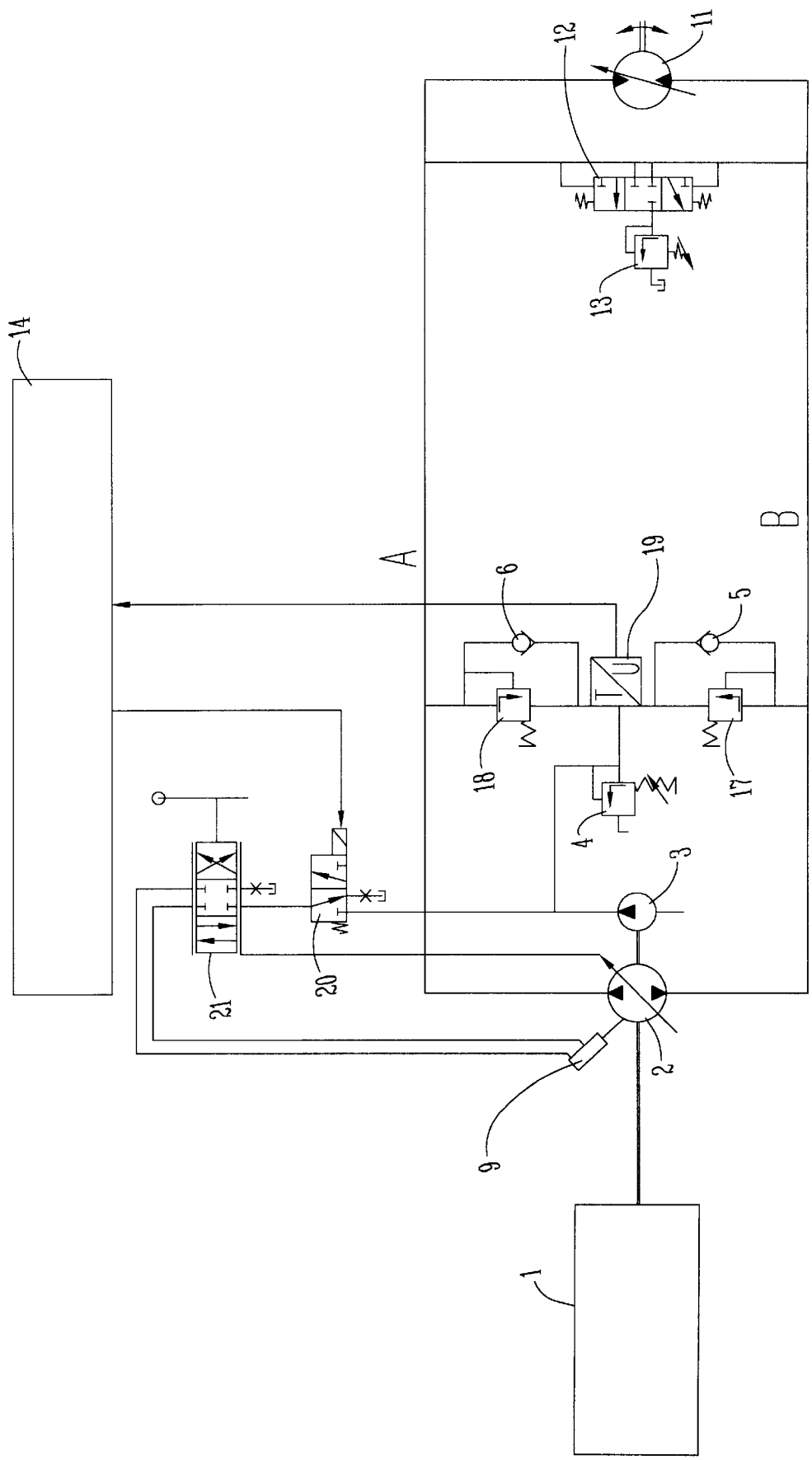
FIG. 2 is a control system according to the invention where the control of the servo piston of the variable pump is done with an additional valve.

In FIG. 2, a simplified scheme of the invention is shown, where the principal design of the transmission system with engine 1, variable pump 2, charge pump 3, check valves 5, 6, high pressure relief valves 17, 18, temperature sensor 19, working lines A, B, hydraulic motor 11, flushing valve 12, flushing relief valve 13, and electronic control device 14. FIG. 2 is equivalent to FIG. 1.

The temperature sensor 19 to control the displacement of variable pump 2 on basis of the oil flow through high pressure relief valve 17 and 18 provides a signal to electronic control 14 which is based on temperature or temperature change rate. The electronic control 14 will manipulate the input signal, and the output signal is used to control an additional valve 20 which is a two-position three-port valve. This valve is connected with the charge pump 3 to provide oil to the control system of servo piston 9 to control the displacement of variable pump 2. The output signal of electronic control 14 controls solenoid valve 20 which is connected to three-position four-port valve 21 which is therefore also controlled by the electronic control and controls the displacement of variable pump 2.

In the embodiment shown in FIG. 2, the temperature signal is used by the electronic control 14 as an electrical input signal that is then processed by the control 14 into a corresponding output signal which reduces control pressure by moving the solenoid valve 20 to the position on the left. This reduces the control pressure supplied to the valve 21 and therefore controls the displacement of the variable pump 2.

On the one hand, the amount of hydraulic fluid which is lost going across high pressure relief valves 17, 18 can be seen as a small disadvantage. On the other hand, that same flow can be advantageously utilized because the system is protected against overheating by the present invention. There are situations where a brief and minimal oil flow across the high pressure relief valves 17, 18 is wanted. Such is the situation when the machine operator must know for certain that the maximum pressure loading of the system is being achieved and therefore the amount of heat being generated in the system should normally be rising. The temperature sensor 19 detects the rising temperature of the oil flow across the high pressure relief valves 17, 18 and the displacement of the pump 2 is reduced accordingly, which indicates to the operator that the desired maximum loading has been achieved.

The advantage of the invented system is that by means of the temperature sensor and the displacement of the variable pump the oil flow through the high pressure relief valve and therefore the amount of the generated heat is controlled. The thermal load of the hydraulic system in high power conditions can be significantly reduced.

It is therefore seen that this invention achieves at least all of its stated objectives.

What is claimed is:

1. A pump control system for a variable displacement hydraulic pump (2) connected in a closed circuit by working pipes (A, B) with a hydraulic motor (11), the system including an electronic control (14), check valves (5, 6) to supply oil from a charge pump (3) into the variable displacement hydraulic pump (2), and a high pressure relief valve (17, 18) in each of the working lines (A, B), the pump control system being characterized by:

a temperature sensor (19) operatively positioned in a fluid passage between the high pressure relief valves (17, 18) and upstream of the check valves (5, 6) with respect to the oil from the charge pump, the temperature sensor (19) being capable of generating a signal based upon hydraulic oil flowing through the high pressure relief valves (17, 18);

the signal from the temperature sensor (19) being processed in the electronic control (14) so as to generate a processed signal to control the displacement of the variable displacement hydraulic pump by moving the servo piston (9) based upon said process signal.

2. The pump control system according to claim 1, wherein the processed signal from the electronic control (14) is connected to a pair of two-position three-port valves (7, 8) each connected to a respective side of the servo piston (9) to control the displacement of the hydraulic pump.

3. The pump control system according to claim 1, wherein the processed signal from the electronic control (14) is used as an electronic pressure limiting system connected to a solenoid valve (20) which is operatively connected to a control valve (21) to control the servo piston (9) of the variable pump (2).

4. The pump control system according to claim 3, wherein the solenoid valve (20) is a two-position three-port valve.

5. The pump control system according to claim 3, wherein the control valve (21) for the servo piston (9) is a four-position three-port valve.

6. The pump control system according to claim 1, wherein the temperature sensor (19) senses a maximum temperature of the hydraulic oil flowing through the high pressure relief valves (17, 18) and generates a corresponding maximum temperature signal to the electronic control (14).

7. The pump control system according to claim 1, wherein the temperature sensor (19) senses a rate of temperature change in the hydraulic fluid flowing through the high pressure relief valves (17, 18) and generates a corresponding temperature change rate signal to the control (14).

8. A method for controlling displacement of a variable displacement pump (2) in a closed circuit, comprising:

placing a temperature sensor (19) in the closed circuit between a pair of high pressure relief valves (17, 18) so as to generate and send a temperature-based signal to an electronic control (14); and controlling the displacement of the variable pump (2) on the basis of said temperature-based signal so as to restrict the temperature of hydraulic fluid flowing across the high pressure relief valves.

9. The method according to claim 8, wherein the step of controlling the displacement of the variable pump (2) is done on the basis of a maximum temperature signal from the temperature sensor (19).

10. The method according to claim 8, wherein the step of controlling the displacement of the variable pump (2) is based on a rate of temperature change generated and sent to the electronic control (14) by the temperature sensor (19).

11. The method according to claim 8, comprising the further step of controlling the displacement of the hydraulic pump (2) to a predetermined value dependent upon a maximum amount of oil flow through the high pressure relief valves (17, 18) measured indirectly by the temperature sensor (19).

* * * * *

UNITED STATES PATENT AND TRADEMARK OFFICE
CERTIFICATE OF CORRECTION

PATENT NO.  : 5,941,689
DATED       : August 24, 1999
INVENTOR(S) : Eckard Skirde It is certified that error appears in the above-identified patent and that said Letters Patent is hereby corrected as shown below:

Column 4, line 43, insert before the word "check" the following: - a pair of -.

Column 4, line 47, strike "being characterized by" and insert - comprising -.

Column 4, line 52, strike "being capable of generating" and insert - generates -.

Column 4, line 53, before the word "hydraulic" insert - the -.

Column 4, line 55, strike the word "being" and insert - is -.

Column 4, line 56, strike "so as".

Column 5, line 22, strike the word "so".

Column 6, line 1, strike the word "as".

Column 6, line 4, strike the words "so as".

Signed and Sealed this

First Day of February, 2000

Attest:

Attesting Officer

Q. TODD DICKINSON

Acting Commissioner of Patents and Trademarks